United States Patent [19]
Johnson et al.

[11] Patent Number: 4,742,322
[45] Date of Patent: May 3, 1988

[54] DIRECT DRIVE SERVOVALVE WITH ROTARY FORCE MOTOR

[75] Inventors: D. Dale Johnson, Mount Clemens; Sydney K. Tew, New Baltimore, both of Mich.

[73] Assignee: Cadillac Gage Textron Inc., Warren, Mich.

[21] Appl. No.: 879,702

[22] Filed: Jun. 27, 1986

[51] Int. Cl.$^4$ .............................................. H01F 7/08
[52] U.S. Cl. .................................... 335/272; 310/29; 310/36
[58] Field of Search .............. 335/272; 310/29, 36–39, 310/77, 266, 86, 87

[56] References Cited

U.S. PATENT DOCUMENTS

| | | | |
|---|---|---|---|
| 2,645,728 | 7/1953 | Willson et al. | 310/27 |
| 3,118,076 | 1/1964 | Held | 310/39 |
| 3,426,224 | 2/1969 | Esters | 310/266 X |
| 3,591,815 | 7/1971 | Grootenhuis | 310/36 X |
| 3,845,338 | 10/1974 | Fawzy | 310/154 |
| 4,019,075 | 4/1977 | Kagami | 310/206 |
| 4,048,502 | 4/1978 | Heyraud et al. | 101/93.29 |
| 4,086,508 | 4/1978 | Masamoto et al. | 310/86 |
| 4,398,167 | 8/1983 | Dickie | 310/364 |
| 4,507,634 | 3/1985 | Vanderlaan | 310/36 X |
| 4,530,487 | 7/1985 | Tew et al. | 251/138 |
| 4,533,891 | 8/1985 | Vanderlaan | 310/29 X |
| 4,560,967 | 12/1985 | Lindsey | 335/229 |

Primary Examiner—Donovan F. Duggan
Attorney, Agent, or Firm—Edward J. Timmer

[57] ABSTRACT

The limited angle rotary force motor includes an inner pole member having multiple permanent magnets disposed on the exterior thereof and a longitudinal bore in which a rotor shaft is journaled for rotation. An annular low inertia coil assembly is positioned in spaced relation around the permanent magnets by sets of spoke-like arms extending from the rotor shaft through transverse openings in the inner pole means. An annular ferritic stainless steel outer pole sleeve is located in spaced relation around the coil assembly to complete the magnetic circuit and withstand hydraulic system pressure to which the motor components are exposed. The outer pole piece is part of the casing or housing for the servovalve.

20 Claims, 7 Drawing Sheets

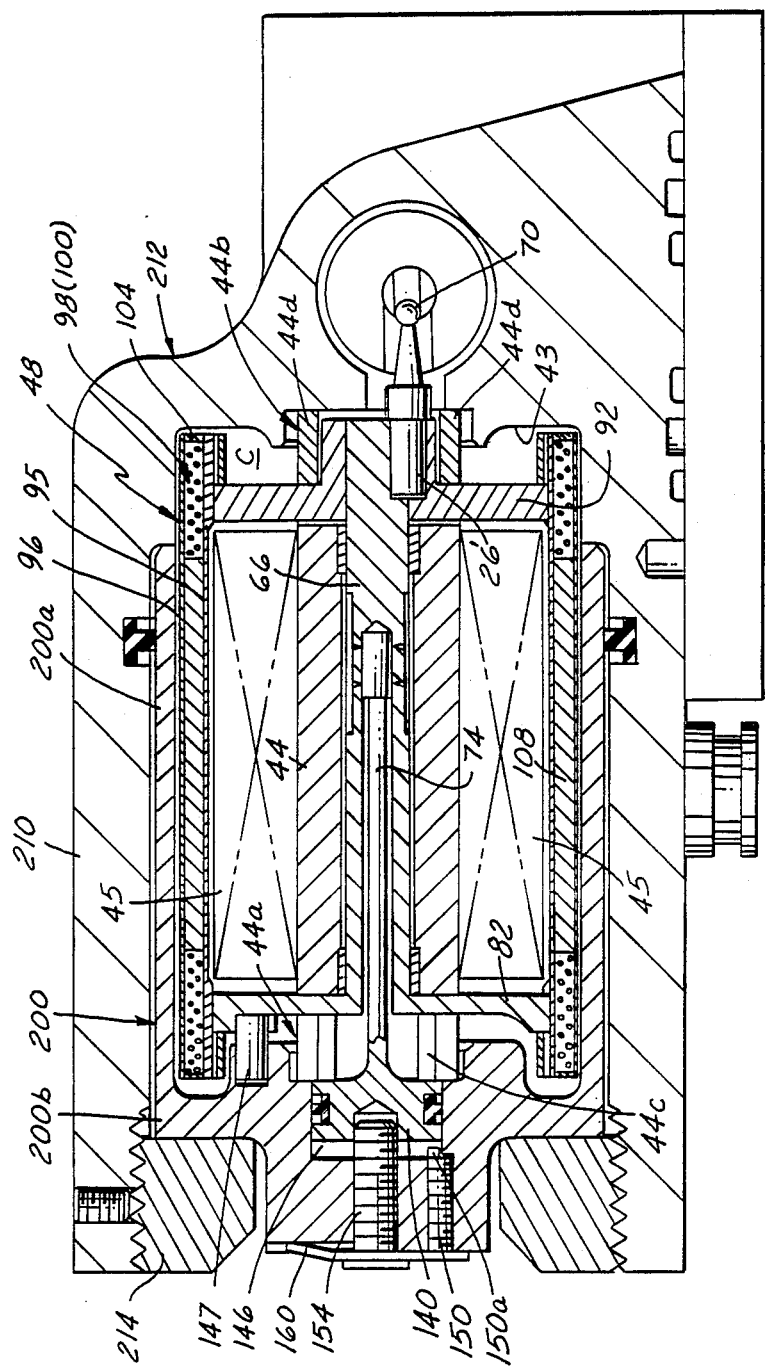

DIRECT DRIVE SERVOVALVE WITH ROTARY FORCE MOTOR

FIELD OF THE INVENTION

The present invention relates to electrical force motors and servovalves having a valve spool driven by a force motor and in particular to rotary force motors of the type having a moving coil for producing rotation through a limited angle.

BACKGROUND OF THE INVENTION

Force motors having a linearly movable coil for directly driving a servovalve of hydraulic or fluid control systems are illustrated in U.S. Pat. No. 4,530,487 issued Jul. 23, 1985, to Sydney K. Tew and Dan O. Bauer and U.S. Pat. No. 4,560,967 issued Dec. 24, 1985 to Charles T. Lindsey.

A limited angle electric rotary actuator or force motor having a rotating coil around a plurality of inner permanent magnets for positioning a magnetic head of a magnetic disk file relative to information tracks on a disk is shown in U.S. Pat. No. 4,398,167 issued Aug. 9, 1983, to Hugh G. Dickie et al.

A pulse motor having a limited rotational coil disposed around inner permanent magnet for actuating a working element such as a printing cylinder is described in U.S. Pat. No. 4,084,502 issued Apr. 18, 1978, to Marc Heyrand et al.

Commutated electrical force motors are shown in U.S. Pat. No. 3,845,338 issued Oct. 29, 1974, to Mohairam M. Fawzy and U.S. Pat. No. 4,019,075 issued Apr. 19, 1977, to Isao Kagami. The Kagami patent uses a rotary coil with hexagonal windings which is not limited to angular rotation. The Fawzy patent employs a rotatable armature shell on which coils are wound toroidally.

U.S. Pat. No. 4,507,634 issued Mar. 26, 1985, to Robert D. Vanderlean illustrates an electrical force motor with fixed coils and a central rotor assembly including a rotor shaft and permanent magnets thereon within a protective cover to prevent potential rotor magnet breakage contamination. The rotor shaft has an eccentric output shaft. The torque null is adjusted by an eccentric pin engaging the rotor casing, the interior of which as well as rotor assembly therein, is subjected to system hydraulic pressure.

SUMMARY OF THE INVENTION

The present invention provides an electrical rotary coil force motor especially useful for, although not limited to, directly driving a proportional servovalve of a high pressure fluid proportional servo control system and which is small in size and weight.

In a typical working embodiment of the invention, an inner pole means supporting magnet means exteriorly thereon includes a longitudinal bore in which a rotor shaft is journaled for rotation. Multiple coil support arms or spokes extend from the rotor shaft through openings in the inner role means with clearance for angular movement therein and support a coil means in spaced relation around the magnet means. The coil means is rotatable between the magnet means and outer pole means in response to electrical signal input from a controller. The rotor shaft includes a bore in which a torsion rod is received with one end attached to the rotor shaft and with another opposite end outside the shaft fixed in position. An outer annular pole means is disposed in spaced relation around the coil means and in a preferred embodiment comprises a generally cylindrical sleeve integral with the casing or housing of the servovalve. The casing is made of ferritic stainless steel such as type 410 so that the sleeve functions as the outer pole piece and also a pressure vessel containing hydraulic system pressure.

In a preferred embodiment of the invention, the coil means is supported from the rotor shaft by sets of multiple angularly spaced apart coil support arms or spokes adjacent opposite ends of the rotor shaft and extending through respective sets of multiple spaced apart transverse openings adjacent opposite ends of the inner pole means with angular clearance to permit limied angular rotation of the rotor assembly. An end portion of the housing closing off the outer pole piece or sleeve includes means thereon for limiting the maximum angular movement of the rotor assembly by engaging in stop relation with a coil support arm or spoke and also includes externally accessible means for adjusting the null position of the rotor assembly as well as locking the adjusted position by engaging the end of the torsion rod which is received in the end portion of the housing.

The present invention also provides a direction drive hydraulic servovalve having a wet electrical force motor for directly actuating a valve spool to control hydraulic fluid flow wherein the force motor includes an outer annular pole member defining a chamber receiving hydraulic fluid at system pressure and in which an inner permanent magnet and coil assembly are disposed and wherein the outer annular pole member is made of ferritic stainless steel to withstand the system pressure and allow the outer pole member to be an integral part of the servovalve casing.

The present invention further provides a coil assembly for electrical force motors wherein the coil assembly includes an inner sleeve and an outer sleeve between which one or more wire coils are disposed and fully encapsulated against contact with hydraulic fluid present. At least one of the sleeves is a metallic sleeve in which an electrical current is generated as the coil assembly moves through the magnetic field established by a permanent magnet of the force motor. The induced current in turn creates an electrical field in accordance with the right-hand thumb rule which is in opposition to the electrical field created by the coil electrical current and as a result provides a desirable motor dampening effect. Preferably, the outer sleeve farthest from the axis of the rotor shaft provides this dampening effect and its radial thickness can be varied to vary the strength of the dampening effect.

BRIEF DESCRIPTION OF THE DRAWINGS

FIG. 14 is a view similar to FIG. 5 for another embodiment of the invention.

DESCRIPTION OF PREFERRED EMBODIMENTS

Figure 1:
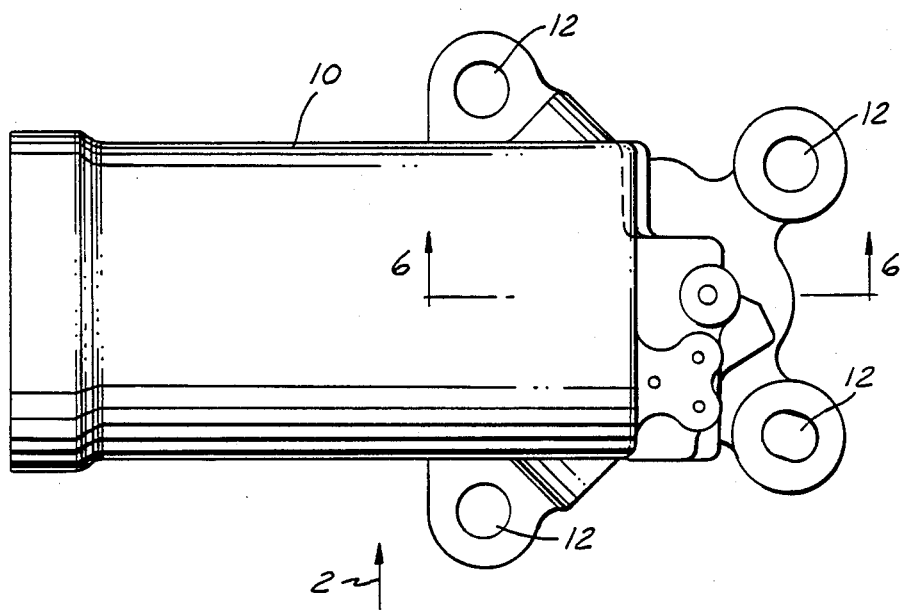
FIG. 1 is a plan view of the direct drive servovalve of the invention.
Figure 2:
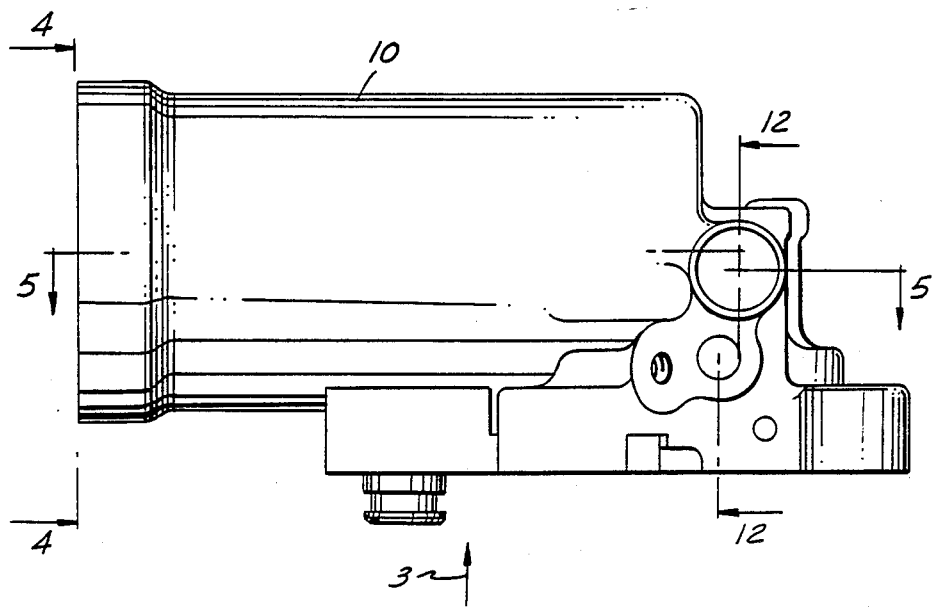
FIG. 2 is an elevation of FIG. 1.
Figure 3:
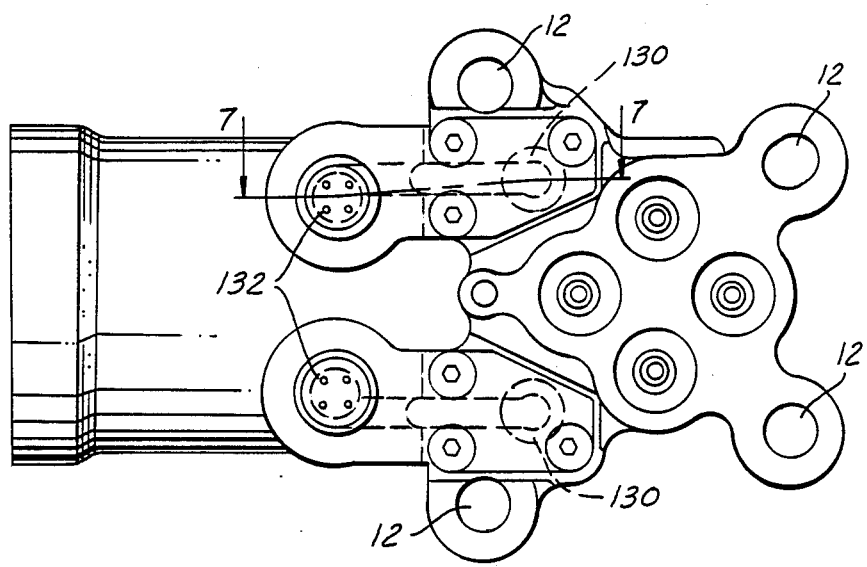
FIG. 3 is a bottom elevation of FIG. 2.

FIGS. 1-12 illustrate a direct drive servovalve constructed in accordance with the invention. The servovalve includes a housing or casing 10 having mounting holes 12 for use in mounting the servovalve on a support.

Disposed cooperatively in the housing 10 are the limited angle or rotation force (torque) motor 20 of the invention and a single 4-way hydraulic spool valve 22 and sleeve 24 in which the valve slides to meter hydraulic flow to ports or slots 26 within the sleeve in known manner. The spool valve 22 is movably positioned axially in the sleeve 24 by the force motor 20, in particular the torque motor output shaft portion 26 which engages the circumferential groove 28 of the spool valve as shown. As the spool valve is moved within its stroke, its control port lands 30 meter the fluid flowing through the metering ports or slots 26 in the sleeve. The valve spool is axially fluid pressure balanced by porting return pressure to each end to prevent null shifts due to pressure differences between the ends of the spool valve.

With reference to FIGS. 5-10, the torque motor 20 inclues an outer annular pole member in the form of a cylindrical tubular sleeve 11 integral with the casing or housing. The casing and sleeve are cast of magnetically permeable ferritic stainless steel, such as Type 410, so that the sleeve 11 can function not only as the outer pole piece of the force motor but also a pressure vessel for containing hydraulic system pressure therewithin as will be explained.

The outer pole sleeve 11 includes a cylindrical internally threaded end sleeve 38 adapted to threadably receive locking collar 39 which holds a housing end closure member 40 in the bore defined by the casing sleeve 11 to close off the outer open end thereof. The closure member 40 has an annular flange 41 that is clamped between the collar 39 and an annular shoulder on the casing to this end, as shown. Defined within the casing sleeve 11, closure member 40 and end wall 43 of the casing is a chamber C in which an inner pole member 44 with permanent rare-earth stator magnets 45 thereon, coil hub assembly 46 and coil assembly 48 are disposed.

As shown best in FIGS. 5 and 7-11, the inner stator pole member 44 has a square cross-sectional exterior between opposite slotted ends 44a,44b on which exterior four permanent rare-earth magnets 45 are attached as by adhesive. The magnets each have an arcuate outer periphery together providing a general circular profile. As is apparent in FIG. 5, one end 44a of the inner pole member 44 is received in a counterbore 50 in the enclosure member 40 while the other opposite end 44b is received in counterbore 52 of the casing end wall 43. Each end 44a,44b is press fit in the respective counterbores 50,52. To this end, end 44a is reduced in size and includes the extensions 44c each with arcuate (circular arc) outer periphery to be press fit into cylindrical counterbore 50. Similarly, end 44b includes the extensions 44d each with a circular arc outer periphery to be press fit into cylindrical counterbore 52. The inner pole member 44 is made of magnetically-permeable low carbon steel such as Type 1010 and supports the coil hub assembly 46 and coil assembly 48 in the chamber C.

The inner pole member 44 includes a longitudinal cylindrical bore 54 and adjacent the opposite ends 44a,44b sets of multiple (four) transverse slots or openings 57a,57b communicating with bore 54. As shown, the slots 57a, 57b are spaced apart around the periphery of opposite ends 44a,44b.

Disposed in the longitudinal bore 54 is adjacent opposite ends thereof are first and second anti-friction bearings 60,62 which rotatably support the coil hub assembly 46 and in particular the rotor shaft 66 of the coil support hub assembly. The rotor shaft 66 includes the output shaft portion 26 in the form of eccentric arm 68 received in counterbore 69 with ball 70 disposed in circumferential groove 28 of the spool valve to actuate same. The other end of the rotor shaft includes a longitudinal bore 72 which receives a torsion return rod 74 having an inner end fixedly attached to the rotor shaft as by welding at locations W. The outer end of the torsion rod extends from bore 72 and is received in counterbore 78 in the end closure member 40 in a manner to be explained herebelow. The torsion rod is made of high strength material having relatively low magnetic permeability such as 13-8 MoPH stainless steel.

The rotor shaft 66 includes an end in the form of an integral low mass hub 80 comprised of multiple (four) spokes or arms 82 each extending transversely or radially and terminating in a yoke with a pair of space apart support fingers 84. Each spoke 82 extends through a respective one of the transverse slots or openings 57a with sufficient angular clearance for the required limited rotation of the rotor shaft and hub. One spoke 82' includes a slot 82a' for purposes to be explained.

The rotor shaft 66 includes another end opposite from hub 80 on which a second low mass hub 90 is fixedly attached or keyed. Hub 90, like hub 80, includes multiple (four) spokes or arms 92 each extending radially and terminating in a yoke with a pair of support fingers 94. Each spoke 92 extends through a respective one of the transverse slots 57b at the corresponding end of the inner pole member with sufficient angular clearance for the required limited rotation of the rotor shaft and hubs 80 and 90.

As shown in the figures, the hubs 80,90 support coil assembly 48 in spaced exterior relation from the circular periphery of permanent magnets 45 and in spaced interior relation from the inner diameter of outer pole sleeve 11 of the casing 10.

Coil assembly 48 includes an inner cylindrical tubular carrier sleeve 95 and an outer cylindrical tubular sleeve 96 which together serve to enclose the two overlying inner and outer wire coils 98,100 therebetween except for the annular end portions 102 which are closed off by encapsulating material 104 between the opposite sleeve end portions. Both sleeves 95,96 also serve as motor dampening means as will be explained.

The inner sleeve 95 includes axially extending grooves 95a, 95b spaced 90° apart around the inner circumference respective hubs 80,90 in a tongue and groove type fit for interconnecting and supporting the coil assembly 48 and hub assembly 46. Retainer rings 49 are press fit into the opposite ends of inner sleeve 95 to lock the spokes and coil assembly in fixed axial position relative to one another.

Inner wire coil 98 is comprised of four coils 98a, 98b, 98c, 98d, of multiple wire strands wound on carrier sleeve 95 around respective posts or spacers 108 adhered on the carrier sleeve 95 and connected in series. Outer wire coil 100 is comprised of four coils 100a, 100b, 100c, 100d of multiple wire strands would over the respective inner coils 98a, 98b, 98c,98d around the respective spacers 108 and connected in series. Inner and outer coils 98,100 are isolated from one another by an insulating layer or film interposed therebetween during winding. The wire for coils 98,100 is Awg 31 gauge size coated with polyimide insulation.

Figure 13:
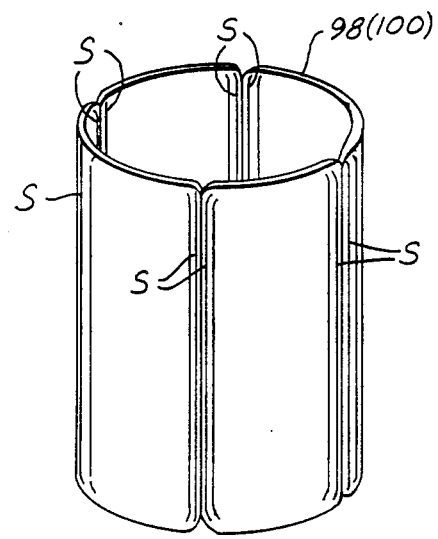
FIG. 13 is a perspective of the motor coils.

Each of the coils 98a–d and coils 100–d is wound in the form of a general rectangle having long axial sides and short transverse sides, FIG. 13. It is apparent that the long axial sides S of adjacent coils of the inner coil are abutted side-by-side with one another, FIGS. 10 and 13. The same side-by-side abutting alignment from one coil to the next adjacent coil is also provided for coils 100a–d. The current in the long axial sides S of adjacent coils flows in the same direction.

Once the coils 98a–d and 100a–d are wound on carrier sleeve 95, outer sleeve 96 is assembled thereon and has an inner diameter such that there is a slight interference fit therebetween. The open annular ends between the inner end outer sleeves 95,96 are then filled with encapsulating material 104 which may be known highly filled epoxy casting compounds such as STYCAST 2762 available commercially from Emerson and Coming Co. Together, the encapsulating material 104 and inner and outer sleeves 95,96 encapsulat the coils 98,100 therebetween to prevent contact between hydraulic fluid in chamber C and the coils.

A low inertia (low mass) coil assembly is thereby provided to maximize dynamic response.

In the preferred embodiment shown in the figures, inner and outer sleeves 95,96 of the coil assembly are made of aluminum alloy such as Type 6061. This provides a light weight coil assembly and the aluminum alloy sleeves not only serve as protective canisters for the coils 98,100 against hydraulic fluid but also as motor dampening means by virtue of electrical currents induced therein when the coil assembly 48 moves through the magnetic field established by the permanent magnets 45 between the inner and outer pole members. The induced current in the sleeves 95,96 itself establishes an induced electrical or magnetic field which is in opposition to the magnetic field from magnets 45 and effects a motor dampening action during operation of the torque motor. The strength or degree of motor dampening can be varied by varying the thickness of one or both of sleeves 95,96. Those skilled in the art will recognize that one or the other, or both of the sleeves 95,96 may be made to provide this motor dampening function.

Figure 8:
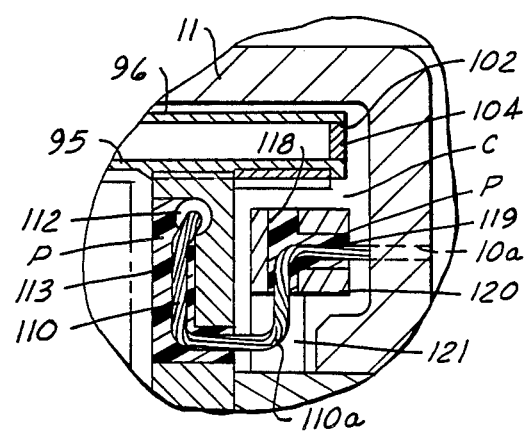
FIG. 8 is an enlarged view taken along lines 8—8 of FIG. 5.
Figure 9:
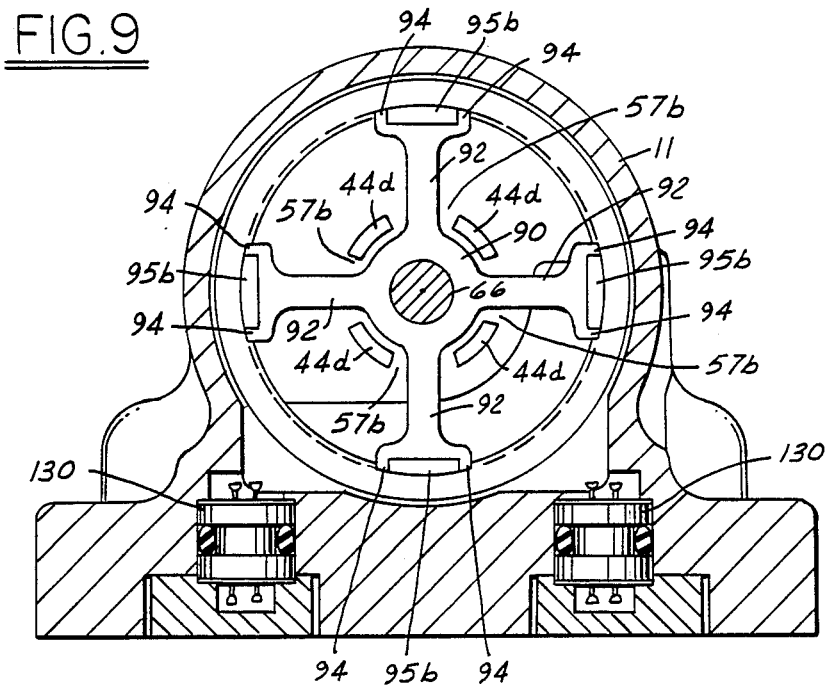
FIG. 9 is a cross-sectional view taken along lines 9—9 of FIG. 5.
Figure 10:
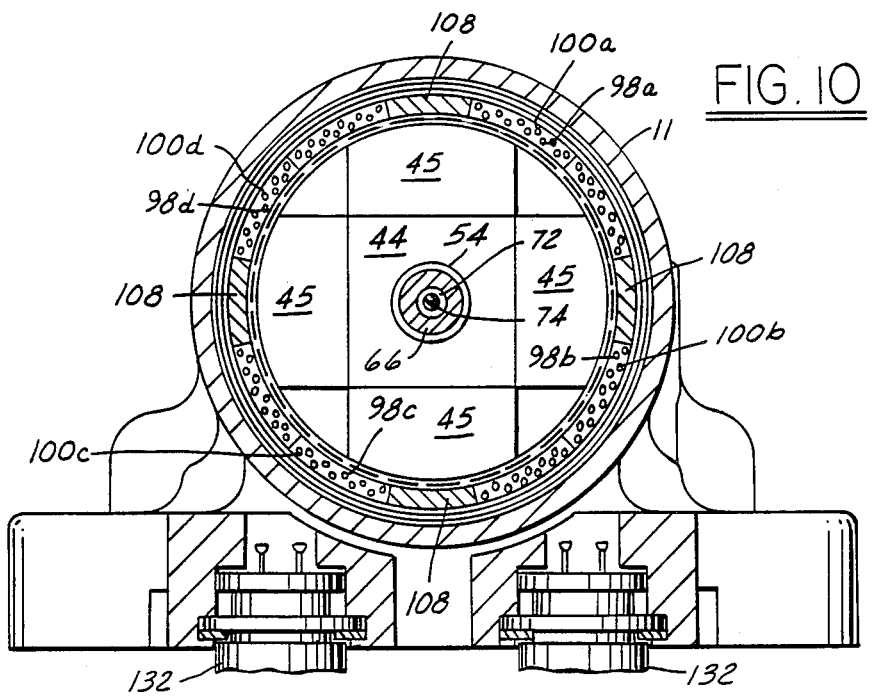
FIG. 10 is a cross-sectional view taken along lines 10—10 of FIG. 5.
Figure 11:
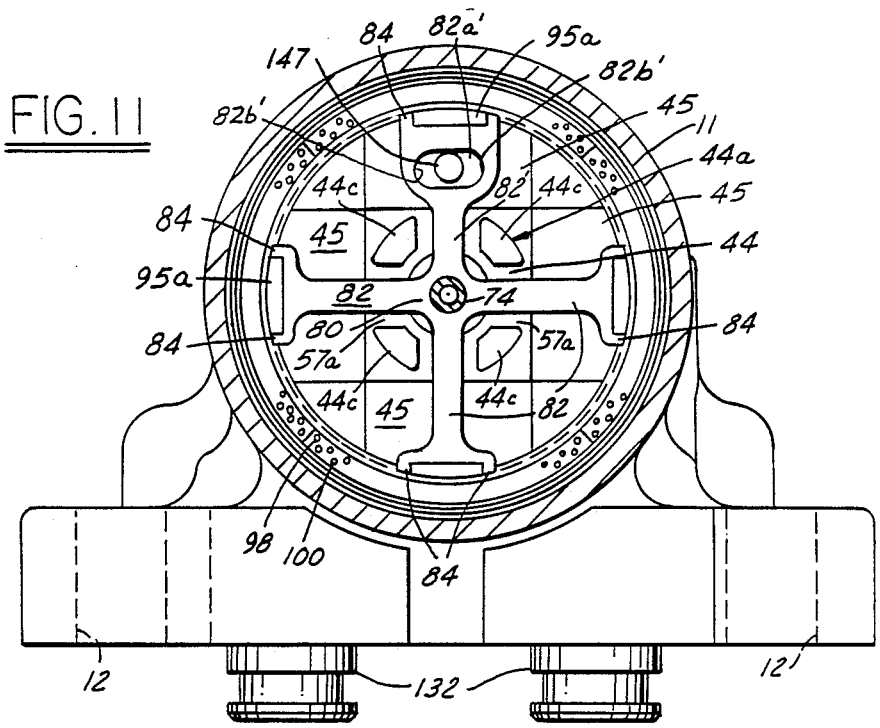
FIG. 11 is a partial cross-sectional view taken along lines 11—11 of FIG. 5.
Figure 12:
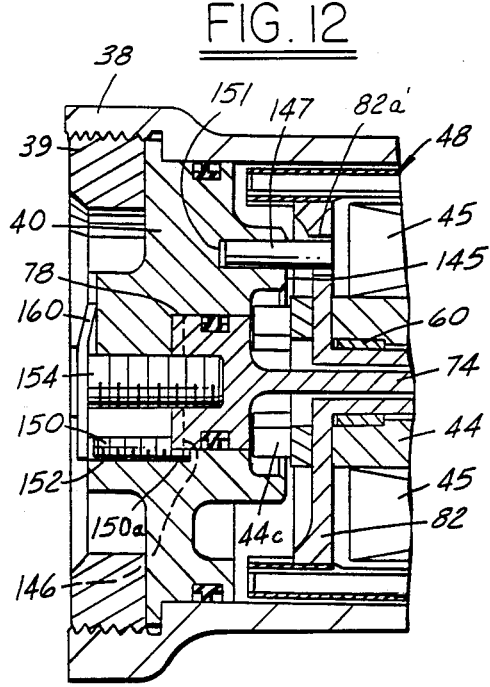
FIG. 12 is a cross-sectional view taken along lines 12—12 of FIG. 2.

Electrical current or signal is provided to the coils 98,100 by two electrical lead wires for each coil 98,100. One of such lead wires 110 is shown in FIG. 8, the others being similarly arranged relative to the associated coil and inner pole member 44. The lead wires 110 are each 30 gauge size insulated multi-strand wire and have one end brazed to the associated coil 98,100 at a locataion inside the encapsulated coil assembly. Brazing is conducted before the outer sleeve 96 and inner sleeve 95 with coils thereon are assembled. Each wire lead 110 exits the coil assembly through a hot (not shown) in the inner sleeve 95 in communication with hole 112 in one of the arms 92. From hole 112, each lead wire 110 is fed through a slotted passage 113 in one of the arm 92 in which a potting material P is then placed as shown and is then extended between the arm 92 and hole 118 and passage 119 of wire retainer collar 120 on the inner pole member 44. Potting material P is placed in radial hole 118 and axial passage 119. The portion 110a of the lead wire between the arm 92 and collar 120 and extending in radial slot 121 in the latter is the flexing portion of the lead wire during operation. From the wire retainers 120, each pair of lead wires associated with each coil is routed through an axial hole 10a in the housing 10 to a respective one of two headers 130 which are sealed against fluid passage therepast. From the headers 130, each pair of lead wires is routed to electrical connector 132, FIG. 7, at the base 138 of the servovalve. A known controller can be connected to connectors 132 to provide electrical input current signals to the coils 98,100.

Figure 4:
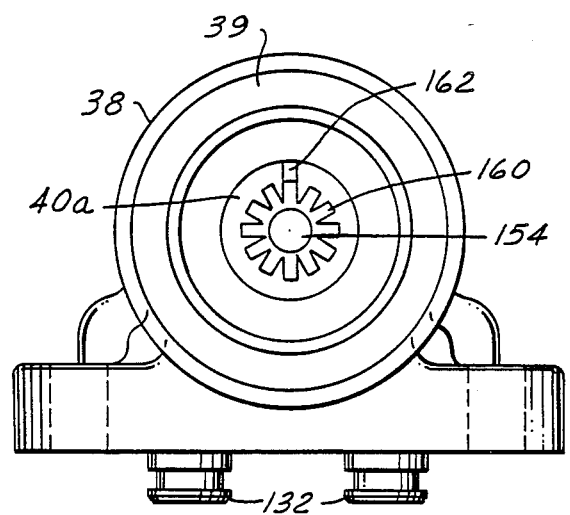
FIG. 4 is an end view of FIG. 2.
Figure 5:
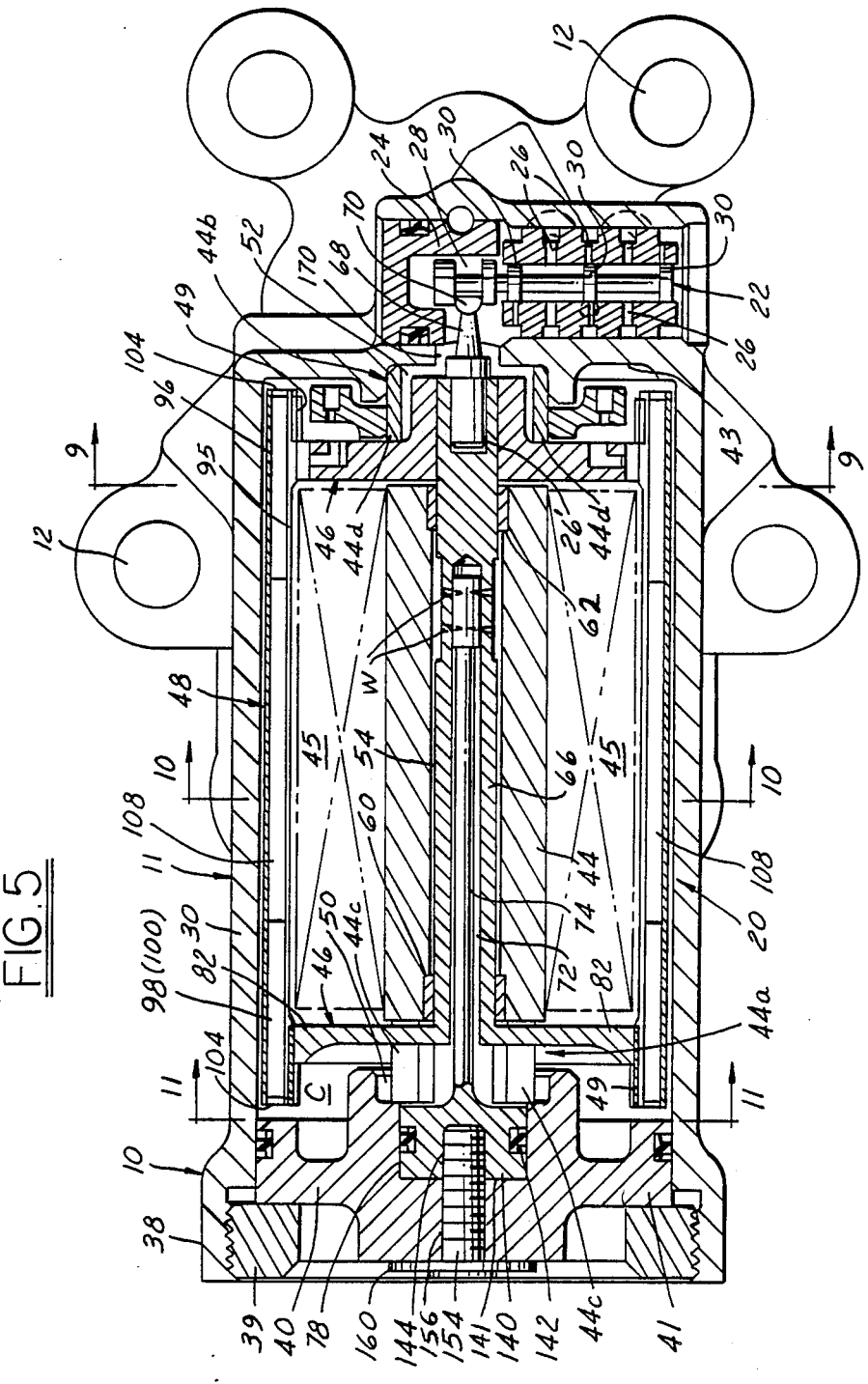
FIG. 5 is a cross-sectional view taken along lines 5—5 of FIG. 2.
Figure 6:
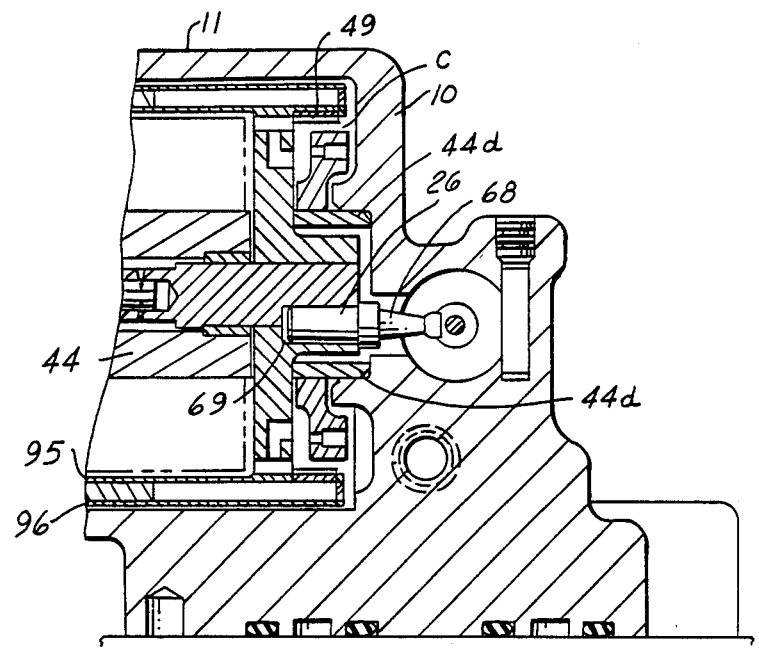
FIG. 6 is a cross-sectional view taken along line 6—6 of FIG. 1.
Figure 7:
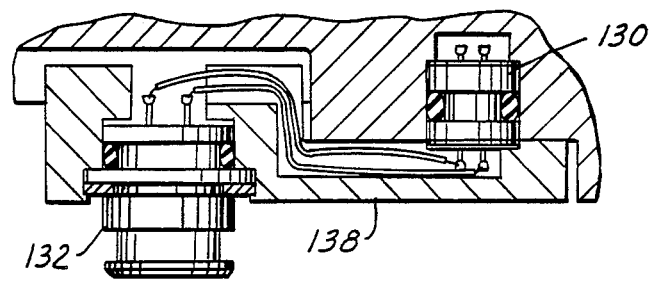
FIG. 7 is a cross-sectional view taken along lines 7—7 of FIG. 3.

Referring to FIGS. 4 and 5, the outer end 140 of torsion return rod 74 is received in counterbore 78 of the end closure member 40 of the housing 10. The outer end 140 is an enlarged cylindrical end with a T oil seal 142 thereon to seal against fluid pressure leakage therepast. The enlarged outer end 140 includes a threaded end bore 144 and also a transverse diametral slot 146, see FIG. 12.

In the annular shoulder 145 surrounding counterbore 78, a dowel pin 147 is pressed into hole 151 to serve as an end-of-stroke stop for angular movement of the coil assembly 48. During assembly of the torque motor, the dowel pin 147 is positioned between two stop surfaces 82b' of slot 82a' machined into the spoke 82' of coil support hub 80, FIG. 12. Optimum pin position is adjusted during motor assembly by rotating the end enclosure member 40, relative to housing sleeve 11. Adjustment in this manner is used to set the motor full stroke stop position to coincide with the desired spool valve maximum flow rate. The dowel pin 147 ensures limited angle rotation, e.g. 8 degrees for maximum stroke of the coil assembly and thus eccentric movement of shaft output portion 26.

An externally accessible null adjustment screw 150 is received in threaded bore 152 in end closure member 40 and includes an eccentric end 154 received in the diametral slot 146 of the end of the torsion return rod. By rotating screw 150, the angular position of the torsion rod 74 and thus the coil assembly 48, its output shaft portion 26 and ultimately the position of spool valve 22 can be adjusted after the motor stop positions are adjusted with dowel pin 147 to the desired null position to coincide with the zero current motor position (or zero torque position on the torsion rod). Once adjusted, the outer end 140 of the torsion return rod 74 is locked by tightening locking screw 154 received in threaded bore 156 on end closure member 40 to load the slotted end face 141 of end 140 against the end closure member 40. Locking screw 154 itself is then locked in position relative to end closure member 40 by pushing one of the bendable keys 160 machined into the screw into a slot 162 machined into the externally exposed surface 40a of end closure member 40.

As those skilled in the art will appreciate, as the coil assembly 48 moves through this limited angle rotation in response to electrical signal commands to the coils 98,100, the torque generated is reacted by the torsion rod 74. When zero current condition is present, the torsion rod functions as a return spring to return the coil assembly 48 to the adjusted null position.

As mentioned hereinabove, the outer pole sleeve 11 in combination with end closure member 40 and casing end wall 43 form chamber C in which the other torque motor components are positioned. By virtue of output shaft portion 26 extending to the spool valve 22 through opening 170 in the housing 10, it is apparent that chamber C will receive and be filled with hydraulic fluid at system pressure during operation of the servovavle. Thus, the torque motor 20 is shown 1s considered "wet" in that the motor components in the chamber C are exposed to system hydraulic fluid and pressure. In effect, the outer pole sleeve 11 also functions as a pressure vessel to contain high system pressures whether they be operating pressure, proof pressure or burst pressure. Casing 10 including outer pole sleeve 11 as a result are made of a high strength ferritic steel such as Type 410 having sufficient strength, e.g. 140,000 psi yield strength, to withstand the high fluid pressures and resulting high hoop stresses involved. The magnetic permeability of the high strength ferritic stainless steel outer pole member is sufficient to complete the magnetic circuit between the inner pole members and permanent magnets. The thickness of the outer pole sleeve 11 is selected to provide minimal reluctance and flux leakage yet with sufficient strength withstand system pressure.

During operation of the torque motor, the output torque of shaft output portion 26 is converted to linear motion at the spool valve 22 by means of the eccentric nature of the arm 26'. To prevent backlash between the ball 70 and groove 28 in the spool valve 22, the outer diameter of the ball and width of the groove are made to close fit tolerance.

FIG. 14 illustrates another embodiment of the invention wherein like reference numerals represent like features. The torque motor shown differs from that previously described in having an outer pole member 200 of can-shape with a sleeve 200a and end wall 200b within sleeve 210 of a light weight aluminum alloy motor casing 212. The can shaped outer pole member 200 is made of magnetically permeable Type 4340 alloy steel and is held in the casing by collar 214 threaded thereinto. The end wall 200b of the outer pole member supports the end 44a of the inner pole member 44, end of torsion rod 50, null adjusting screw 150, null locking screw 154, and dowel pin 147, all of which function in the same manner described hereinabove. Thus, the outer pole member serves several functions in this embodiment.

While certain specific and preferred embodiments of the invention have been described in detail hereinabove, those skilled in the art will recognize that various modifications and changes can be made therein within the scope of the appended claims which are intended to include equivalents of such embodiments.

We claim:

1. A limited angle rotary force motor comprising:
   (a) an inner support member disposed in a motor chamber and having a longitudinal bore with multiple angularly spaced apart transverse openings extending from the longitudinal bore
   (b) a magnet disposed on the inner support member,
   (c) a rotor assembly including a rotor shaft rotatably disposed in the longitudinal bore and having an output portion for exerting motive force, a coil assembly supported from the rotor shaft in spaced relation around the magnet and rotatable in response to an electrical signal input, and multiple coil support arms extending from the rotor shaft for supporting the coil assembly in said spaced relation with each arm extending through a respective one of the transverse openings with angular clearance to permit limited angular rotary movement of the rotor assembly,
   (d) an outer pole member spaced from the coil assembly.

2. The force motor of claim 1 wherein the inner member is a magnetically permeable inner pole member and includes antifriction bearing means therein between the inner pole member and rotor shaft for rotatably supporting the rotor shaft in the inner pole member.

3. The force motor of claim 1 including a motor housing defining a motor chamber, adjusting means on the motor housing and a torsion rod having one end extending inside and affixed to the rotor shaft and the other end extending from inside the rotor shaft and adjustably connected to the motor housing, said adjusting means engaging said other end of the torsion bar for adjusting zero current null position of the rotor assembly.

4. The force motor of claim 3 wherein said adjusting means comprises an adjusting screw an eccentric head with the head received in a slot in said other end of the torsion bar.

5. The force motor of claim 4 further including means on the housing for locking the adjusted null position of the rotor assembly wherein said locking means comprises a locking screw threaded into the housing and engaged to said other end of the torsion rod extending from the rotor shaft.

6. The force motor of claim 5 wherein the locking screw includes multiple arms deformable into a groove in the housing to lock the locking screw.

7. The force motor of claim 1 including means on the motor housing for engaging one of said coil support arms for limiting maximum angular stroke of the rotor assembly.

8. The force motor of claim 1 wherein multiple angularly spaced apart coil support arms extend from the rotor shaft adjacent each opposite end thereof and each respective arm extends through a respective one of the multiple angularly spaced apart transverse openings in the inner support member adjacent each opposite end thereof to support the coil assembly adjacent its opposite ends.

9. A limited angle rotary force motor comprising:
   (a) a motor housing having a motor chamber,
   (b) an inner pole member disposed in the motor chamber and having a bore,
   (c) a magnet assembly disposed on the inner pole member,
   (d) a rotor assembly including a rotor shaft rotatably disposed in the bore of the inner pole member and having an output portion for exerting a motive force and having a shaft bore, a coil assembly supported from the rotor shaft in space relation around the magnet assembly rotatable between the inner and outer pole members and angularly rotatable in response to an electrical signal input, and a torsion rod with one end thereof received in the shaft bore and affixed to the rotor shaft and with the other end adjustably connected to the motor housing outside the shaft bore for adjusting angular position of the rotor assembly through rotation of the torsion rod, and (e) an outer pole member spaced from the coil assembly.

10. The force motor of claim 9 wherein a part of the motor housing forms the outer pole member.

11. A direct drive servovalve having an electric force motor directly driving a hydraulic spool valve wherein the force motor includes a housing with a sleeve portion forming an outer pole member and defining a chamber receiving pressurized hydraulic fluid, said housing being made of high strength magnetically permeable stainless steel to withstand the pressurized fluid, an inner pole member with a permanent magnet thereon disposed in the chamber, and a rotor assembly rotatably disposed in the chamber including a rotor shaft and a coil assembly supported between the permanent magnet and outer pole member from the rotor shaft for rotation in the chamber in the pressurized hydraulic fluid.

12. The servovalve of claim 11 wherein the coil assembly of the force motor is encapsulated to prevent contact of wire coil therein with hydraulic fluid.

13. The servovalve of claim 12 wherein the housing includes an end closure member closing off the sleeve portion.

14. In a force motor having means for generating a magnetic field, a coil assembly rotatable through a limited angle through the magnetic field in response to electrical signals, said coil assembly including an inner cylindrical tubular sleeve and concentric outer cylindrical tubular sleeve with a plurality of wire coils disposed side-by-side therebetween for limited angle rotary movement together as a unitary assembly through the magnetic field, at least one of said inner sleeve and outer sleeve having an electrical current induced therein during movement of the coil assembly in the magnetic field whereby said at least one of said inner sleeve and outer sleeve functions as a motor dampening means resisting coil rotary movement through the magnetic field.

15. The force motor of claim 14 wherein the inner sleeve and outer sleeve extend past the coil therebetween to form annular open ends adjacent opposite ends of the coil and encapsulating material fills the open annular ends.

16. The force motor of claim 14 wherein the inner sleeve includes axially extending grooves spaced apart around the inner periphery and into which coil support means extends.

17. The force motor of claim 15 wherein the inner sleeve, outer sleeve and encapsulating material in the annular ends encapsulate the coil therein to prevent contact with external hydraulic fluid.

18. The force motor of claim 1 wherein a lead wire from the coil extends through passage means in one of the support arms and is secured to said arm and wherein a fixed collar is axially spaced from the support arms on the inner support member and the lead wire extends from the arm to the collar with the portion of the lead wire therebetween flexing during rotation of the coil and arm.

19. The force motor of claim 9 including adjusting means on the motor housing for rotating said other end of the torsion rod relative to the motor housing.

20. The force motor of claim 19 including locking means on the motor housing for engaging and locking the torsion rod in adjusted position.

* * * * *

UNITED STATES PATENT AND TRADEMARK OFFICE
CERTIFICATE OF CORRECTION

PATENT NO. : 4,742,322

DATED : May 3, 1988

INVENTOR(S) : D. Dale Johnson et al

It is certified that error appears in the above-identified patent and that said Letters Patent is hereby corrected as shown below:

In the specification, Column 1, line 39, change "Vanderlean" to --Vanderlaan--. Column 2, line 14, change "limied" to --limited--; line 25, change "direction" to --direct--; and line 63, change "line" to --lines--. Column 3, line 36, change "incluces" to --includes--. Column 4, line 15, delete "is". Column 5, line 9, change "would to --wound--; line 16, change "100-d" to --100a-d--; line 34, change "encapsulat" to --encapsulate--; and line 68, change "hot" to --hole--. Column 6, line 46, change "154" to --150a--. Column 7, line 10, change "servovavle" to --servovalve--; line 27, after "strength" insert --to--; line 47, change "50" to --74--; and line 62, after "bore" insert --,--. Column 8, line 25, after "screw" insert --having--; line 22 change "bar to --rod--; and line 59, change "space" to --spaced--.

Signed and Sealed this

Eleventh Day of December, 1990

*Attest:*

HARRY F. MANBECK, JR.

*Attesting Officer*  *Commissioner of Patents and Trademarks*